Dec. 25, 1951 A. C. SCHROEDER 2,579,705

COLOR TELEVISION SYSTEM

Filed Jan. 27, 1950

INVENTOR
Alfred C. Schroeder
BY
William A. Zalesak
ATTORNEY

Patented Dec. 25, 1951

2,579,705

UNITED STATES PATENT OFFICE 2,579,705

COLOR TELEVISION SYSTEM

Alfred C. Schroeder, Southampton, Pa., assignor to Radio Corporation of America, a corporation of Delaware Application January 27, 1950, Serial No. 140,786

14 Claims. (Cl. 313—92)

This invention relates to television and more particularly to forms of all-electronic television systems using cathode ray beam scanning devices wherein color images are reproduced by a scanning operation of two or more selected color components.

This application is a continuation of my copending application Serial No. 760,295, forfeited. It is expressly noted that I am not abandoning the invention described and claimed in my said copending application.

The invention is directed primarily to television systems wherein image reproduction is accomplished by super-positioning in registry a group of selected color component images which, taken together, produce resultant images in substantially their natural colors and with natural luminescent gradations.

The present invention in one specific application may be advantageously employed in a television systems wherein the image producing tube is provided with a target or image screen area upon which a plurality of electron beams is directed to converge at the image screen and wherein the intensity of each beam is representative of one selected component color signal train. Color images result from the impact of the plurality of separately controlled electron scanning beams upon the target or image screen area.

Image producing tubes employing a plurality of scanning ray beams are well known to the art and may take, for example, the form shown in the copending applications of Alfred N. Goldsmith Serial No. 548,238 filed August 5, 1944, entitled "Color Television," now Patent 2,481,839 and Serial No. 548,239, also filed August 5, 1944, entitled "Multicolor Television," which was abandoned upon the filing, on July 19, 1947, of continuation-in-part application Serial No. 762,175.

The applications of Alfred N. Goldsmith referred to immediately above provide for scanning ray tubes having a plurality of independently controlled and deflected electron beams.

Anothter type of scanning ray tube to which this invention is applicable is shown and described in my copending application, Serial No. 730,637, filed February 24, 1947, entitled "Picture Reproducing Apparatus," wherein a plurality of scanning ray beams is employed and which utilizes a single deflection arrangement.

When a single deflection arrangement is employed for the deflection of a plurality of independent electron beams, it becomes obvious that the separation of the electron guns must be kept at a minimum in order to conveniently produce the desired registry throughout the total deflection cycle. It is to this type of system that this invention is found to be particularly applicable.

In all types of systems employing a plurality of electron beams directed to a single target area for the purpose of laying down a plurality of registered selected color component images, it is necessary that the area of impact of each of the separate electron beams be distinguishable from each other. When widely separated beams are employed the target area or image screen may be composed of irregular elements of the type shown and described in the applications of Alfred N. Goldsmith referred to above. However, when closely adjacent electron guns are employed for providing the plurality of electron beams, the difference in angle of incidence between the plurality of beams and the target element is small, and the target or screen surfaces shown and described in the prior art are not generally suitable.

According to this invention, a surface area for the target or image screen is provided which is suitable for use with a plurality of electron beams having a small difference of impact angle. The surface area comprises a plurality of elemental surfaces, some of which extend in a plane including the axis line which is centrally located with respect to all the associated scanning beams and wherein all the elemental surfaces are arranged to intercept only one of the electron beams. Color selection may then be had by coating the surfaces with different of the selected component colors, one color for each beam.

A primary object of this invention is to provide an improved color television system employing a single image producing tube.

Another object of this invention is that of producing images in substantially their natural color by television without mechanically moving parts.

Still another object of this invention is that of providing for the reproduction of color television images by either of the sequential or simultaneous systems.

Another object of this invention is to provide a target electrode or image screen suitable for employment in previously developed systems employing either a plurality of scanning ray beams or a scanning ray beam which is bent in accordance with a predetermined time sequence.

Other and incidental objects of the invention will be apparent to those skilled in the art from a reading of the following specification and an inspection of the accompanying drawing in which.

Figure 1:
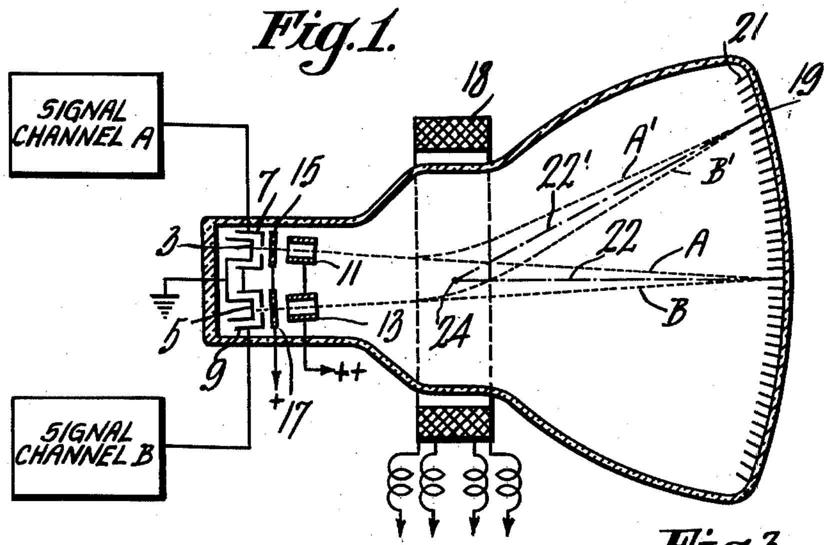
Fig. 1 shows schematically the operation of this invention in one of its forms.

Turning now in more detail to Fig. 1, there is shown an evacuated envelope 1 having a pair of electron guns including cathodes 3 and 5.

There are associated with cathodes 3 and 5 accelerating electrodes 7 and 9, 11 and 13. A control electrode 15 is associated with cathode 3 and control electrode 17 is associated with the gun including cathode 5.

Electron gun structure is well known in the art and needs no further explanation here, except perhaps to refer to the following specific articles describing the theory and operation of electron guns as employed in cathode ray tubes. "Theory of the Electron Gun" by I. G. Maloff and D. W. Epstein in the "Proceedings of the Institute of Radio Engineers" for December 1934; and "Improved Electron Gun for Cathode Ray Tubes" by L. E. Swedlund in "Electronics" for March 1946.

Control electrodes 15 and 17 are connected respectively to signal channel A and signal channel B. The signal trains of video frequency energy arriving on signal channels A and B separately modulate the electron beams A and B respectively. There is also associated with envelope 1 a cathode ray beam deflection arrangement 18, which includes both horizontal deflection and vertical deflection coils. Deflection coils and their associated deflection circuits are also quite well known in the art, and a detailed description of suitable coils, together with detail regarding their operation, may be found, for example, in the U. S. patent to W. A. Tolson, No. 2,101,520, issued December 7, 1937. Although a magnetic system of deflection is illustrated, an electrostatic system of deflection may be employed without departing from the spirit of this invention. Electrostatic deflection arrangements are shown and described in an article entitled "Electrostatic Deflection Kinescope Unit for Television Receiver" by J. B. Sherman in "QST" for March 1939.

Suitable deflection circuits for exciting the deflection coils 18 are shown and described in an article entitled "Deflection Circuits and Television Receivers" by E. W. Engstrom and R. S. Holmes in "Electronics" for January 1939.

Deflection of the electron beams A and B will cause them to follow the path A' and B'.

By an appropriate arrangement of gun parts and beam focusing both electron beams A and B are caused to converge always at a common point, whether or not they are acted upon by the deflection coils 18. The target area or image screen 19 consists of a series of phosphor coated elements 21, which roughly extend in a plane including a common axis line 22 or 22' which is centrally located with respect to each of the electron beams A and B and A' and B' respectively. As shown in Fig. 1, elements 21 are strips, or shelf-like projections, extending outwardly from the tube face plate or screen 19. The planes of the shelf-like projections run across the face plate 19 in substantially parallel directions. However, the plane of each shelf 21 will extend between the respective approaching paths of beams A and B so that one beam will strike one side of each shelf 21 and the other beam will strike the other side of the shelf, at every point of beam contact.

Beams A and B pass through the scanning field of coils 18 simultaneously and at different spaced points. As shown in Fig. 1, the beam directions are deflected by the scanning fields of coils 18 along new paths A' and B'. As long as the planes of supports 21 extend between the deflection points of the two beams, then the two beams will always strike opposite sides of the phosphor coated strips 21.

If it is desired that beams A and B approach strips 21 at the same angle of incidence, then the planes of strips 21 should include the common axis 22 of beams A and B. Thus, the plane of each strip 21 will pass through a common point 24, midway between the points of deflection of beams A and B, and which is also the common intersection point of the axes 22, 22', etc., of beams A and B, in all positions taken by beams A and B when scanned over the target surface.

It will be seen from an examination of the drawing in Fig. 1 that if strips 21 run in a horizontal direction, electron beam A in all its positions will strike only the upper surfaces of the elements 21. Likewise, electron beam B will strike only the bottom of the surfaces of elements 21. Furthermore, electron beam A will not strike the elements 21 on their bottom surfaces, nor will electron beam B strike any of the elements 21 on their upper surfaces during any part of the scanning operation.

It is quite well known that all colors can be reproduced by a proper combination of a plurality of selected component colors.

One given set of such component colors would be three monochromatic colors of wave lengths 7.0, 5.35, and 4.0 times $10^3$ Angstroms.

Although perfect color reproduction cannot be obtained by the employment of only two selected component colors, a certain degree of accuracy may be employed, and for the purpose of explanation of the operation of this invention in one of its forms, a typical two selected component color system will be described. Supposing, for example, that in Fig. 1, the upper part of the elements 21 be coated with a luminescent material giving a color in the blue end of the spectrum, while the bottom surfaces of elements 21 are coated with a luminescent material giving a light in the red end of the spectrum. If an entirely blue image is being scanned at the image pickup or transmitting station, the signal train representative of the blue image will be transmitted to control electrode 15 through signal channel A. The electron gun generating beam A will therefore cause a blue luminescence on the screen 19 while the electron beam B will be extinguished. If, however, a red image is being scanned at the transmitting station, there will be a signal in signal channel B and no signal in signal channel A, and therefore only electron beam B will be activated, and a red image will appear on the image screen 19. If, however, the image being scanned at the transmitting station is an intermediate color, both electron beams will be activated and the resultant image on image screen 19 will be a color caused by the combination of the red and blue components in accordance with the energy transmitted through channels A and B respectively. If, however, the image being scanned is an alternate combination of both blue and red, the intensity of electron beams A and B will be governed appropriately in such a manner that the red portions will show red, and the blue portions will show blue on the image screen 19.

Figure 2:
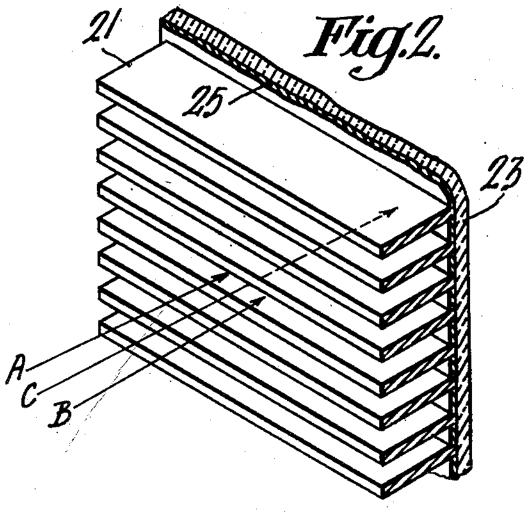
Fig. 2 shows a greatly magnified segment of a screen employed in one form of this invention.

One form of structure of the image screen 19 is shown in detail in Fig. 2. Elemental strips 21 are shown fixed to a supporting plate structure 23 and positioned in such a manner that electron beams designated as A and B strike separate surfaces, the plane of each strip 21 containing the common axis of both the electron beams A and B as described above.

It will be seen, in Fig. 2, that if elemental strips run in a horizontal direction, electron beam A strikes only the upper surface of the elements 21, and electron beam B strikes only the lower surface of the elements 21. It is preferred for the purpose of image reproduction that the elemental strips 21 have thicknesses less than picture element size and the spacing between strips 21 is in the order of picture element size. A picture element size may be defined as the smallest portion of the luminescent picture which can be resolved by the electron beams. It also may be considered as roughly the focused spot size of beams A and B at the surface of screen 19.

In still another form of this invention, the dimensions and spacing of elements 21 are so chosen that no portion of the electron beams A or B can strike the exposed surface of the supporting plate 23. This can be accomplished by selecting an appropriate ratio between the width of the elements 21 and the angle of approach of beams A and B to the planes of elements 21, in such a manner that the elements 21 will actually shade the exposed surface of support 23 from the electron beams A and B.

The support member 23 may be of a transparent material such as glass. In one form of the invention, the member 23 has a coating 25 of light diffusing material so that, if the surfaces of elements 21 are coated with a luminescent material and the elements 21 themselves are of an opaque material, the light appearing from the rear of the transparent support member 23 will appear diffused. Furthermore, there would result a color quantity distortion, because one, viewing elements 21 through a transparent support member 23, would see only the bottom of some of the elements 21 and the tops of the others, depending upon the angle each strip has relative to the viewing direction. By having a support member of light diffusing material, the light from the upper and lower surfaces would properly fuse.

By extending elements 21 through the light diffusing material 25 into the support member 23 as shown in Fig. 2, the light diffusing will be confined to the elemental area struck by the electron beams. This will eliminate any reduction in detail caused by light diffusion.

The phosphor materials coating the sides of elements 21 may be laid down in their proper places by spraying at an angle to the plane of each strip to selectively coat the proper surfaces with the proper color.

It is commonly known that a more faithful reproduction of colors may be obtained by employing three selected component colors.

One form of this invention involves a diffusing material 25 which has a luminescence of another selected component color, such as, for example, green. Therefore, as a third beam, C, arrives along the common axis 22 centrally located between beams A and B, it will strike only the surface 25 which has green luminescent properties, and if beam C is properly modulated in accordance with the green component signal, a three selected component color image may be reproduced.

Figure 3:
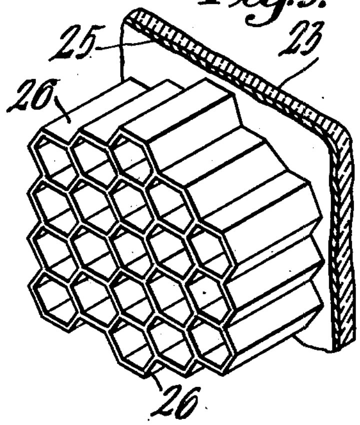
Fig. 3 shows an enlargement of a section of a screen in accordance with another form of this invention.

Still another form of this invention adaptable for employment with three selected component colors is shown in Fig. 3, wherein the support member 23 has a coating 25 and the phosphor coated elements 26 are essentially tubular, with a hexagonal cross sectional configuration. The phosphor screen thus may have the form of a honeycomb, as shown.

Figure 4:
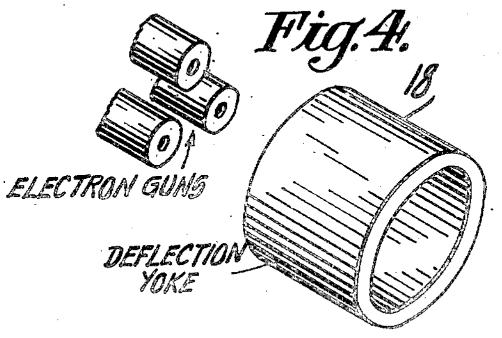
Fig. 4 illustrates schematically the employment of a single deflection yoke for three separate electron guns.

If a three electron gun arrangement such as shown in Fig. 4 is employed in connection with a screen of the type shown in Fig. 3, it is possible to obtain color reproduction by the compiling of three separate selected component colors.

Figure 5:
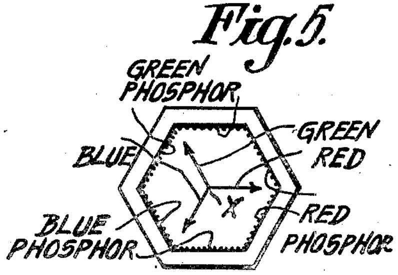
Fig. 5 shows for purposes of explanation the operation of the form of the invention illustrated in Fig. 3.

This is accomplished, as shown in Fig. 5, by coating the inside surfaces adjacent alternate corners of the honeycombs with phosphors of different selected component colors. If three independent electron beams are directed in the direction illustrated by the arrows in the center of Fig. 5, the magnitude of the separate reproduced colors may be controlled. It follows that, if the size of the element as shown in Fig. 5 is of the order of a picture element and closely adjacent to or "nested" with other elements, a reproduction may be had of the original color image by appropriate scanning in the manner taught by the present television art. In a manner similar to that described above, the tubular elements of screen 26 must be so oriented that the axis of each tubular element passes substantially through the central portion of a circle described by the three deflection points of the beams in the field of coils 18 and also that each flat phosphor coated wall portion of elements 26 must extend between the directions of approach of two of the beams and parallel or coincident with the direction of approach of the third beam. In this manner, each plane wall portion of the honeycomb-type screen 26 will be struck by only two of the three beams and with each of the two beams striking opposite sides.

When a single source of electrons is employed and the electron stream is bent to provide for color selection, it may be assumed that the beam originates at point X of Fig. 5 and is bent in the directions shown by the arrow in a recurring sequence to provide for color selection.

Having thus described the invention, what is claimed is:

I claim:

1. A luminescent screen for a cathode ray tube, said screen comprising a multiplicity of tubular elements nested together, each of said elements having substantially a honeycomb cross sectional configuration, a luminescent material on the inner surfaces of said tubular elements.

2. A luminescent screen for a color television picture tube, said screen comprising a plurality of tubes of hexagonal cross-section, said tubes being positioned so that the axes thereof extend through the central portion of a common small circle, a phosphor material coating the inner surfaces of said tubes.

3. An electron discharge device comprising, an electron gun structure for producing an electron beam along a path, a luminescent screen spaced from said gun structure and positioned transversely to said beam path, and deflection means between said gun structure and said screen for scanning said beam over said luminescent screen, said screen including tubular elements each having an axis offset from the point of deflection of said beam.

4. An electron discharge device comprising, an electron gun structure for producing an electron beam along a path, a luminescent screen spaced from said gun structure and positioned transversely to said beam path, and deflection means between said gun structure and said screen for scanning said beam over said luminescent screen, said screen including tubular elements each having a hexagonal cross section and an axis offset from the point of deflection of said beam.

5. An electron discharge device comprising, an electron gun structure for producing an electron beam along a path, a luminescent screen spaced from said gun structure and positioned transversely to said beam path, and means between said gun structure and said screen for scanning said beam over said luminescent screen, said screen comprising shelf-like extensions the planes respectively of which are offset from the point of deflection of said beam.

6. An electron discharge device comprising, electron gun means for producing an electron beam along a path, a luminescent screen spaced from said gun means and positioned transversely to said beam path, and deflection means between said electron gun means and said screen for scanning said beam over said luminescent screen, said screen including a plurality of elements having flat portions each extending in a plane inclined to the direction of the said beam path, a phosphor coating on said elements.

7. An electron discharge device comprising electron gun means for producing a plurality of electron beams along respective paths, a luminescent screen spaced from said gun means and positioned transversely of said beam paths, electron beam deflection means between said gun means and said screen for scanning said beams over said luminescent screen, said screen including a plurality of elements, said elements having flat portions each lying substantially in a plane extending between the directions from which two of said beam paths intersect said screen.

8. An electron discharge device comprising electron gun means for producing a plurality of electron beams along respective paths, a luminescent screen spaced from said gun means and positioned transversely of said beam paths, electron beam deflection means between said gun means and said screen for scanning said beam over said luminescent screen, said screen including a plurality of elements, said elements having flat portions each lying substantially in a plane extending between the directions from which two of said beam paths intersect said screen, each of the planes of said element portions including the direction from which a third beam path intersects said screen.

9. An electron discharge device comprising electron gun means for producing a plurality of electron beams along respective paths, a luminescent screen spaced from said gun means and positioned transversely of said beam paths, electron beam deflection means between said gun means and said screen for scanning said beam over said luminescent screen, said screen including a plurality of elements, said elements having flat portions each lying substantially in a plane extending between the directions from which two of said beam paths intersect said screen, each of the planes of said element portions including the direction from which a third beam path intersects said screen, phosphor coatings on both surfaces of said flat element portions.

10. An electron discharge device comprising electron gun means for producing a plurality of electron beams along respective paths, a luminescent screen spaced from said gun means and positioned transversely of said beam paths, electron beam deflection means between said gun means and said screen for scanning said beam over said luminescent screen, said screen including a plurality of elements, said elements having flat portions each lying substantially in a plane extending between the directions from which two of said beam paths intersect said screen, each of the planes of said element portions including the direction from which a third beam path intersects said screen, coatings of different phosphor materials respectively on both surfaces of said flat element portions, and a third phosphor material on said screen between said flat element portions.

11. A luminescent screen for a color television picture tube, said screen comprising a translucent plate, a plurality of tubes of hexagonal cross-section mounted adjacent said plate, each of said tubes being positioned so that the axis thereof is substantially normal to said plate, a plurality of different phosphor coatings on the inner surfaces of each tube, each of said phosphor coatings having the property of fluorescing with a different color of light.

12. A luminescent screen for a color television picture tube, said screen comprising a translucent plate, a plurality of spaced strips mounted edgewise to one surface of said plate, said strips positioned so that the planes thereof will substantially pass through a common point, and phosphor coatings on the side surfaces of said strips.

13. A luminescent screen for a color television picture tube, said screen comprising a translucent plate, a plurality of spaced strips mounted edgewise to one surface of said plate, said strips positioned so that the planes thereof will substantially pass through a common point, and a different phosphor coating on the opposite sides of each of said strips.

14. A luminescent screen for a color television picture tube, said screen comprising a translucent plate, a plurality of spaced elements mounted adjacent one surface of said plate, said elements each having surfaces extending substantially normal to said plate surface, said elements positioned so that extensions of said surfaces substantially pass through a common point, and phosphor coatings on said element surfaces.

ALFRED C. SCHROEDER.

REFERENCES CITED

The following references are of record in the file of this patent:

UNITED STATES PATENTS

| Number | Name | Date |
|---|---|---|
| 1,988,605 | Michelssen | Jan. 22, 1935 |
| 2,296,908 | Crosby | Sept. 29, 1942 |
| 2,307,188 | Bedford | Jan. 5, 1943 |
| 2,310,863 | Leverenz | Feb. 9, 1943 |
| 2,416,056 | Kallmann | Feb. 18, 1947 |
| 2,446,440 | Swedlund | Aug. 3, 1948 |
| 2,446,791 | Schroeder | Aug. 10, 1948 |
| 2,480,848 | Geer | Sept. 6, 1949 |
| 2,481,839 | Goldsmith | Sept. 13, 1949 |
| 2,498,705 | Parker | Feb. 28, 1950 |
| 2,518,200 | Sziklai et al. | Aug. 8, 1950 |